(12) United States Patent
Liu et al.

(10) Patent No.: US 6,681,473 B1
(45) Date of Patent: Jan. 27, 2004

(54) METHOD AND APPARATUS FOR HERMETICALLY SEALING FIBER ARRAY BLOCKS

(75) Inventors: Bin Liu, Goleta, CA (US); R. Kehl Sink, Santa Barbara, CA (US); David Welsh, Goleta, CA (US); Yuanjian Xu, Thousand Oaks, CA (US)

(73) Assignee: Calient Networks, Inc., San Jose, CA (US)

( * ) Notice: Subject to any disclaimer, the term of this patent is extended or adjusted under 35 U.S.C. 154(b) by 140 days.

(21) Appl. No.: 10/078,066

(22) Filed: Feb. 15, 2002

(51) Int. Cl.$^7$ ................................................ G02B 6/00
(52) U.S. Cl. ...................... 29/458; 29/527.2; 29/530; 385/120; 385/137
(58) Field of Search ........................ 29/407.09, 407.1, 29/458, 527.2, 530; 385/115, 116, 120, 137; 427/250, 255.21, 443.1

(56) References Cited

U.S. PATENT DOCUMENTS

| | | | | | |
|---|---|---|---|---|---|
| 3,061,526 A | * | 10/1962 | Skolnick | ..................... | 205/125 |
| 3,332,757 A | * | 7/1967 | Hawkins | ..................... | 65/410 |
| 3,853,658 A | * | 12/1974 | Ney | ..................... | 156/180 |
| 5,135,590 A | * | 8/1992 | Basavanhally et al. | ....... | 156/64 |
| 6,093,453 A | * | 7/2000 | Ang | ..................... | 427/438 |
| 6,295,404 B1 | * | 9/2001 | Ichigi et al. | ................ | 385/137 |
| 6,553,174 B2 | * | 4/2003 | Winer | ..................... | 385/137 |

* cited by examiner

*Primary Examiner*—Gregory Vidovich
*Assistant Examiner*—Jermie E. Cozart
(74) *Attorney, Agent, or Firm*—Blakely, Sokoloff, Taylor & Zafman LLP

(57) ABSTRACT

A method and apparatus hermetically sealing a fiber array block is described. In one embodiment, a fiber array plate is fabricated and an array of tapered holes formed therein. An adhering metal layer, such as a titanium, nickel and gold multilayer, is deposited upon the fiber array plate. A solder preform is positioned on the fiber array plate so that the array of holes in the solder preform corresponds to the array of holes in the array plate. Fibers having an adhering metal layer deposited thereon, are then inserted through the fiber array plate. The tapered holes make the fiber insertion process easier. The fiber array plate is then heated such that the solder preform melts causing the solder to fill any gaps between the fiber array plates and the fiber. When the solder cools a hermetic seal is formed while the fibers remain accurately positioned.

13 Claims, 9 Drawing Sheets

METHOD AND APPARATUS FOR HERMETICALLY SEALING FIBER ARRAY BLOCKS

FIELD OF THE INVENTION

The present invention relates generally to the fabrication of optic fiber array blocks and more particularly to methods and apparatuses for hermetically sealing the same.

BACKGROUND OF THE INVENTION

Recent innovations in the design and fabrication of optical switching systems have made possible switching systems having thousands of optic fiber inputs and outputs.

FIG. 1 represents, generally, an optical switching system in accordance with the prior art. System 100, shown in FIG. 1, includes a first optic fiber array block 110, a first lens array 120, a first mirror array 130, a second mirror array 140, a second lens array 150, and a second optic fiber array block 160. In practice the optic fiber arrays may be bonded to the lens arrays to form collimator arrays. The optic fiber array block 110 and 160 contain an array of optic fibers that transmit light beams. For example, a fiber of optic fiber array block 110 may transmit a beam to a lens of the first lens array 120. The first lens array 120 focuses the beam for transmission to the first mirror array 130. The mirror arrays contain an array of movable mirrors that are positioned to reflect and redirect beams from the individual fibers of the fiber arrays. The beam is redirected from the first mirror array 130 to the second mirror array 140. From the second mirror array 140, the beam is directed to a lens of the second lens array 150, focused, and transmitted to the appropriate individual fiber of the output optic fiber array block 160. The optical switching system 100 allows light beams from any fiber of the first optic fiber array 110 to be directed to any fiber of the second optic fiber array block 160. In this way, optical signals are switched from one fiber to another.

Fiber array blocks, such as fiber array block 10, are typically formed by inserting fibers into a plate having an array of holes formed within it. To facilitate inserting the fibers, two fiber array plates may be joined to form a fiber block. The first plate has an array of holes that are substantially greater than the fiber diameter for coarsely positioning the fibers and the other plate has holes that are only slightly larger than the fiber diameter for finely positioning the fibers.

In order for the optical switching system to function properly, the fibers must be held in position with the fiber array plate. For an optical switching system such as system 100 to be functional, the transmitted beams must meet certain criteria within specified tolerances. Movement of the fibers within the fiber array block may detrimentally affect the characteristics of the transmitted beam. Beam parallelism is the relative angle of different beams from the same fiber array or lens array. If the fibers are allowed to shift position it can cause the beams to be angled relative to one another. If the output beams from the fiber block are not parallel, they won't shine directly through the corresponding lens of the lens array and consequently won't shine directly on the corresponding mirror of the mirror array. If less of the beam impacts the mirror, then less of the beam is transmitted through the switching system. At some point this loss of signal strength renders the system inoperable.

Typically an epoxy is placed between the two fiber array plates that form the fiber array block. After the fibers are in place, liquid epoxy may be poured between the two plates. The epoxy then fills the gaps between the fibers and the holes of each plate. After curing, the epoxy becomes rigid and holds the fibers in place.

Although using epoxy to hold the fibers in place is straightforward and relatively inexpensive, the use of epoxy has several drawbacks. The epoxy is an organic material and may degrade significantly over time. The epoxy does not provide a hermetic seal to protect system components from the environment. In humid environments especially, the epoxy may allow the transmission of water vapor through the system. Water vapor may damage the surface of the mirrors and other components of the system.

Additionally, the mechanical strength of the epoxy may deteriorate over time, eventually allowing the fibers to shift.

SUMMARY OF THE INVENTION

A method for hermetically sealing a fiber array block is described. A fiber array plate is fabricated. The fiber array plate has an array of tapered holes formed therein. An adhering metal layer is deposited upon the fiber array plate. A preform is positioned on the fiber array plate so that the array of holes in the preform correspond to the array of holes in the array plate. Fibers having an adhering metal layer deposited thereon are then inserted through the fiber array plate. The fiber array plate is then heated such that the preform melts causing the material of the preform to fill any gaps between the fiber array plates and the fiber, thus forming a hermetic seal between the fiber array and the fiber.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

A method and apparatus for hermetically sealing a fiber block is described. In one embodiment, an inorganic material is used to seal the fiber block. In one embodiment, the holes of each fiber array plate are tapered and the surface is coated with a thin layer of an adhering metal such as titanium, nickel and gold. A preform is then placed between the two fiber array plates. The preform may be, for example, solder or other like material (e.g., low melting point metal such as tin). After the fibers have been positioned, the fiber array plates are heated enough to melt the solder preform. The liquid solder then fills the gaps between the fibers and the holes of the fiber array plates. When the solder cools a hermetic seal is formed while the fibers remain accurately positioned.

An intended advantage of an embodiment of the invention to provide a hermetic seal for a fiber array block. Another intended advantage of one embodiment is to provide accurate and secure positioning of the fibers within the fiber array block. Another intended advantage of one embodiment is to make the metal deposition process easier by tapering the holes of the fiber array plate.

Figure 1:
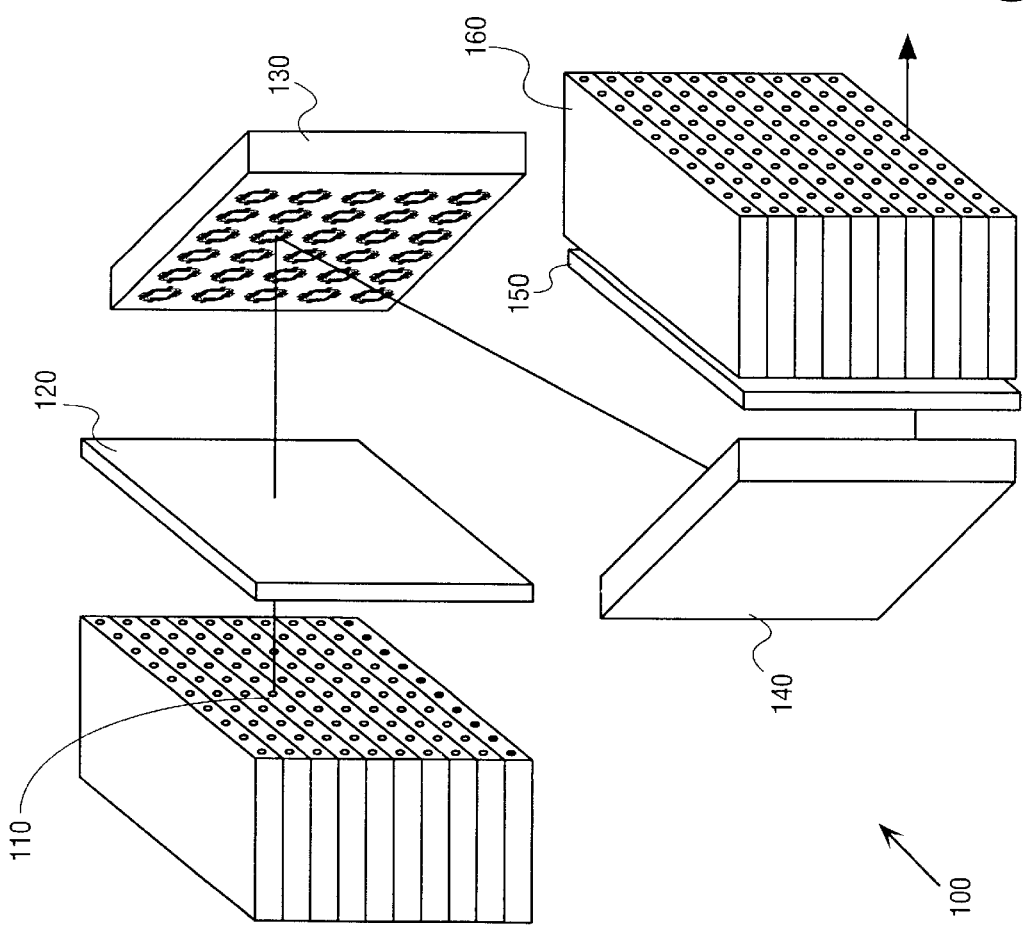
FIG. 1 illustrates an optical switching system in accordance with the prior art.
Figure 2:
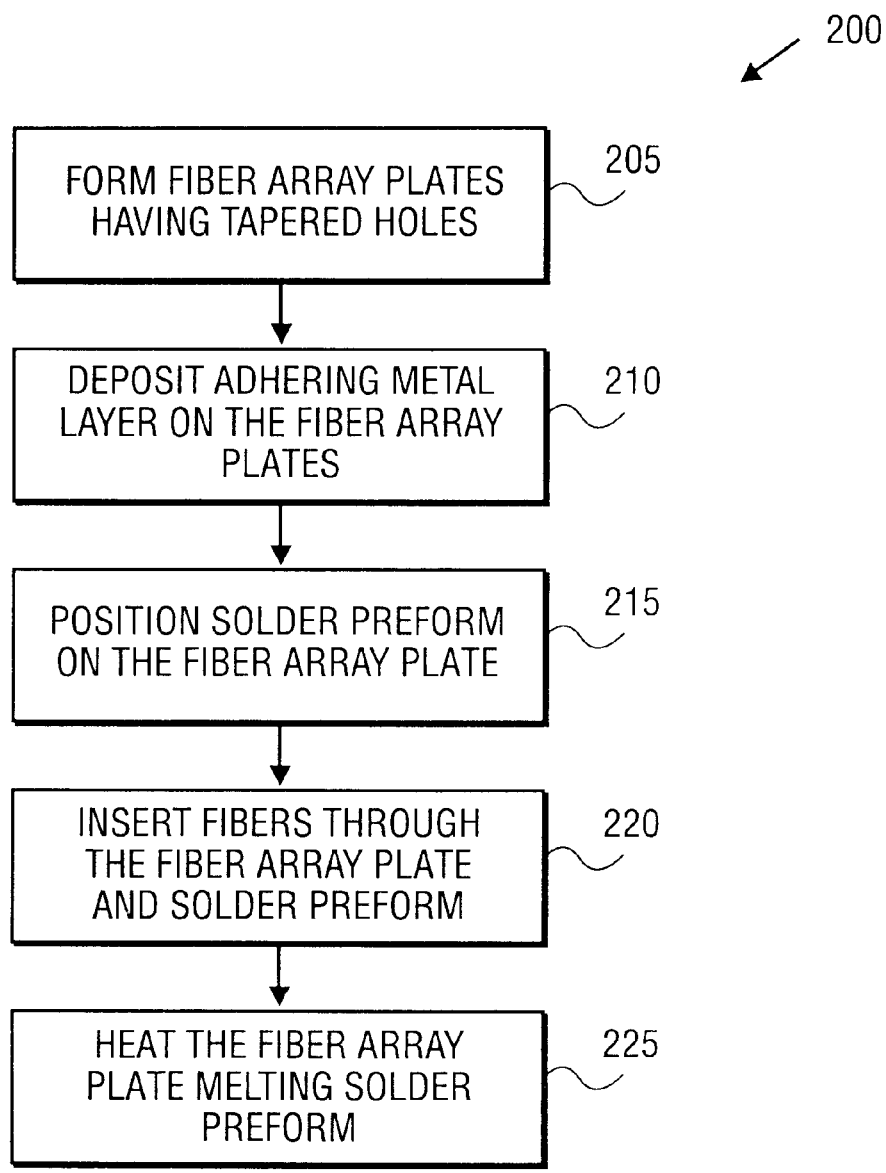
FIG. 2 is a process flow diagram in accordance with one embodiment of the present invention.

FIG. 2 is a process flow diagram in accordance with one embodiment of the present invention. Process 200, shown in FIG. 2, begins with operation 205 in which fiber array plates are formed. The plates may be formed from silicon, ceramic, glass, or other materials though processes well known in the art. The plates may have formed within them a two-dimensional array of holes. Etching, laser drilling, or other methods known in the art may be used to form the holes. In one embodiment, silicon wafers are used and the holes are formed through a combination of wet etching and dry etching processes. The holes may then be tapered using an anisotropic wet etching process using potassium hydroxide.

Figure 3:
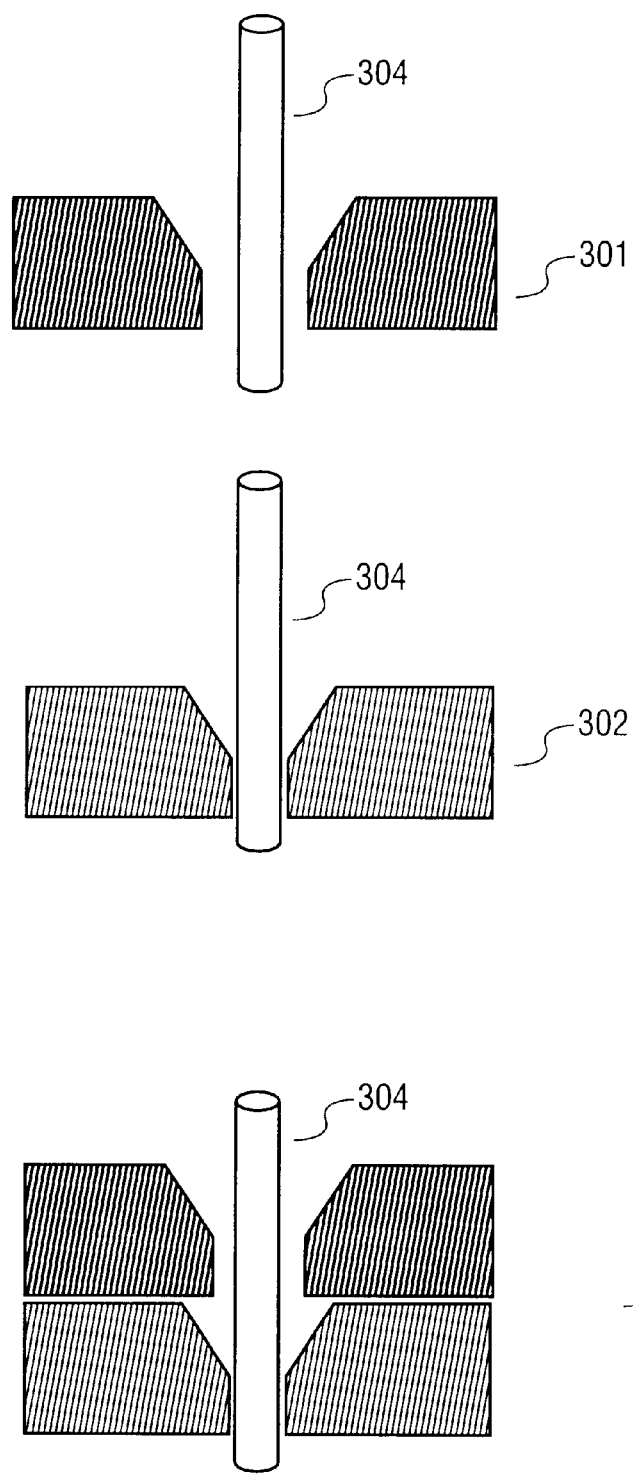
FIG. 3 illustrates fiber array plates having tapered holes in accordance with one embodiment of the present invention.

In accordance with one embodiment, each of the holes may be tapered as shown in FIG. 3. Fiber array plate 301 has tapered holes that are significantly larger than the diameter of the fiber 304. The fiber 304 may be, for example, single mode fiber having a diameter of 125 microns. The larger hole allows fiber array plate 301 to be used for coarse positioning of the fiber 304. Fiber array plate 302 has tapered holes that are only slightly larger than the diameter of the fiber 304. Fiber array plate 302 is used for fine positioning of the fiber 304. Fiber array block 303 is the combination of fiber array blocks 301 and 302 and allows for coarse and fine positioning of the fiber.

Figure 4:
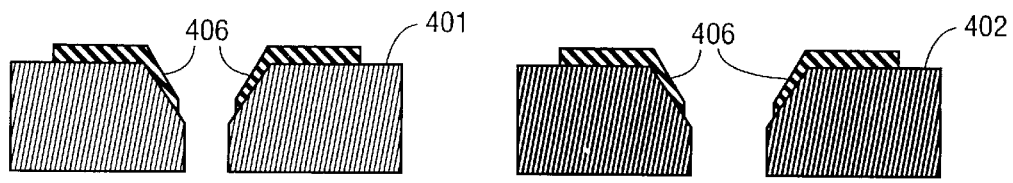
FIG. 4 illustrates fiber array plates having an adhering metal layer in accordance with one embodiment of the present invention.

Process 200, shown in FIG. 2, continues with operation 210 in which the fiber array plates are coated with an adhering metal. Solder, and like materials, do not adhere well to the fiber array plate material (e.g., silicon) so the face of the fiber array plate is coated with an adhering metal such as gold, nickel, titanium, or other like materials or multilayers thereof. FIG. 4 shows coarse positioning fiber array plate 401 and fine positioning fiber array plate 402 each having an adhering metal layer 406 in accordance with one embodiment of the present invention. As shown in FIG. 4, adhering metal layer 406 extends to the tapered sides of the fiber array plates 401 and 402. The adhering metal layer 406 may be formed through many alternative processes known in the art including sputtering, evaporation, electroplating, or electroless plating. In one embodiment, adhering metal layer 406 is a multilayer combination having a layer of titanium approximately 200 Å thick, a layer of nickel approximately 3000 Å thick, and a layer of gold approximately 2000 Å thick.

Figure 5:
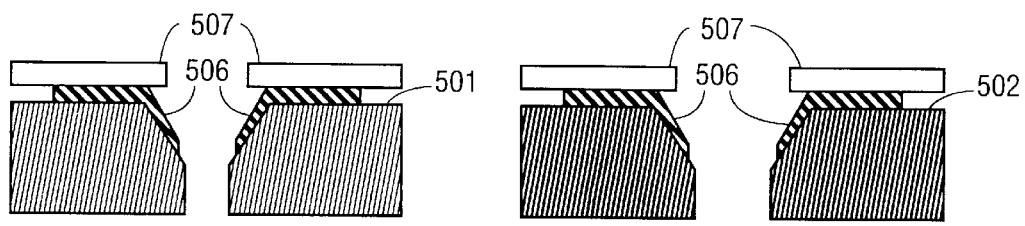
FIG. 5 illustrates the application of an adhering metal layer and a solder preform to fiber array plates in accordance with one embodiment of the present invention.

Referring again to process 200, at operation 215 a preform is placed on one or both of the fiber array plates. The preform is a thin sheet of, for example, solder that has holes corresponding to the holes in the fiber array plate. FIG. 5 shows fiber array plates 501 and 502 each having an adhering metal layer 506 and a solder preform 507 placed on the adhering metal layer 506. The solder preform 507 is a sheet of solder placed upon the fiber array plate (e.g., fiber array plate 501). The solder preform 507 may be aligned upon the fiber array plate using alignment pins so that the holes of the solder preform 507 correspond to the holes of the fiber array plate.

At operation 220 of process 200, the fiber is inserted into the fiber array plate and through the solder preform. At operation 225, the fiber array plate is heated causing the solder preform to melt and flow into any gaps between the fiber array plate and the fiber. In one embodiment the solder preform melts at approximately 187° C. and the fiber array plate is heated to approximately 240° C. When the solder cools, a hermetic seal is created while each fiber remains accurately positioned.

Figure 6A:
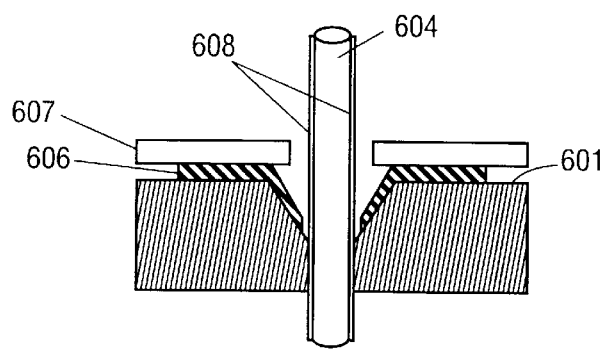
FIG. 6a illustrates a fiber inserted into the fiber array plate in accordance with one embodiment of the present invention.

FIG. 6a shows a fiber array plate 601 having an adhering metal layer 606 deposited upon it. Fiber array plate 601 also has solder preform 607 aligned and placed upon adhering metal layer 606. Fiber 604 is inserted in fiber array plate 601. Fiber 604 an adhering metal layer 608 deposited upon it. Adhering metal layer 608 serves the same function for fiber 604 as adhering metal layer 606 serves for fiber array plate 601, it allows the melted solder to adhere to fiber 604 and form a hermetic seal. Typically, the fiber has a glass core with a protective coating. A portion of the coating is stripped and an adhering metal layer is deposited upon the exposed glass core of the fiber as described above in reference to the adhering metal layer 406 deposited upon the fiber array plate 401.

Figure 6B:
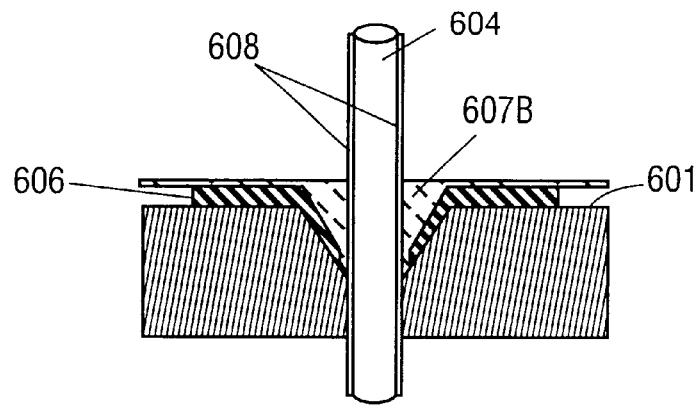
FIG. 6b illustrates the solder preform melted to fill the gaps between the fiber and the fiber array plate in accordance with one embodiment of the present invention.

FIG. 6b shows fiber array plate 601 after solder preform 607 has melted and filled the gap between the fiber 604 and the fiber array plate 601. The melted solder adheres to adhering metal layer 606 deposited on the fiber array plate 601 and adhering metal layer 608 deposited on fiber 604. Thus, the solder forms hermetic seal 607b.

Figure 7A:
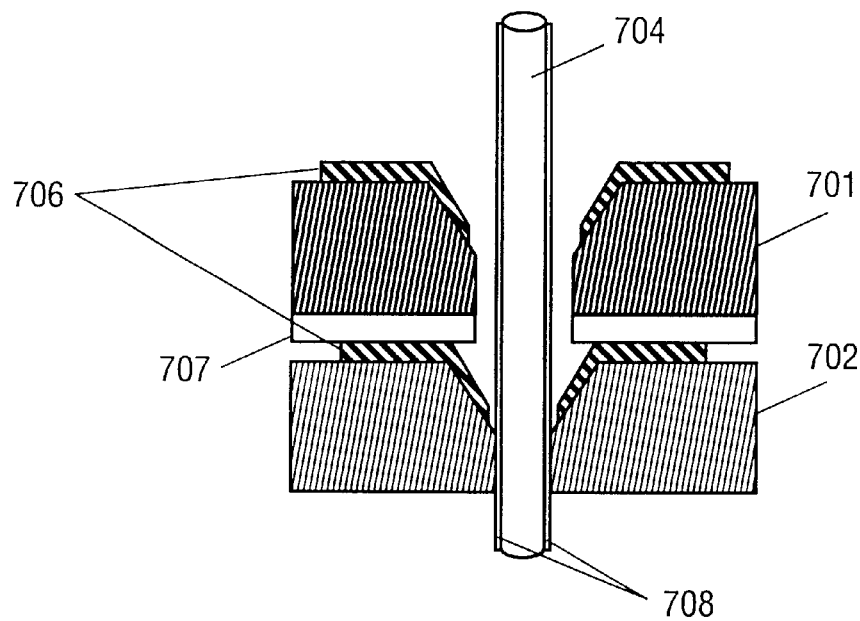
FIGS. 7a, 7b, 8, illustrate a fiber array block in accordance with alternative embodiments of the present invention.

In an alternative embodiment, two fiber array plates may be pressed together so that the pressure aids in forcing the melted solder into the gaps between the fiber and the fiber array plate. FIG. 7a illustrates an example of such an embodiment. As shown in FIG. 7a, coarse positioning fiber array plate 701 is pressed together with fine positioning fiber array plate 702. When fiber array plates 701 and 702 are heated, the solder preform 707 will melt and be forced into the gap between the fiber 704 and the fiber array plates 701 and 702. Upon cooling, the solder will adhere to adhering metal layers 706 and 708, as described above, and form a hermetic seal.

The solder preforms are typically formed as sheets of solder approximately 0.5 mm thick. If more solder is desired, additional, or thicker, solder preform sheets may be applied. For example, an additional solder preform sheet may be applied to fine positioning fiber array block 702, or may be applied to coarse positioning array block 701.

Figure 7B:
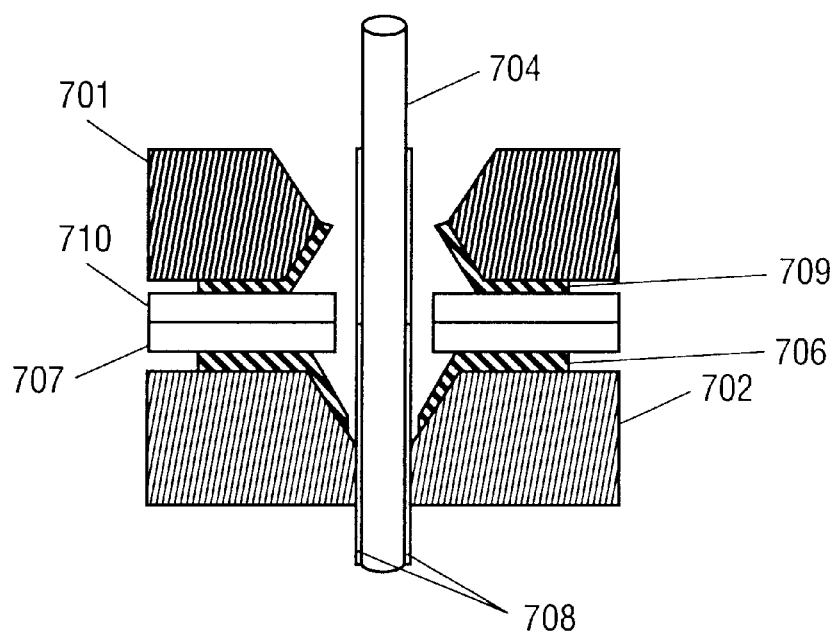

FIG. 7b shows an alternative embodiment in which solder preform layers are applied to the adjoining surfaces of both fiber array plates. As shown in FIG. 7b, coarse positioning fiber array plate 701 may have holes tapered on both sides, the front side, through which the fiber is inserted and the backside through which the fiber exits. An adhering metal layer 709 may be deposited on the backside of fiber array plate 701 and a solder preform layer 710 may be applied to adhering metal layer 709. As described above, when fiber array plates 701 and 702 are pressed together and heated, solder preform layers 707 and 710 melt and fill the gap between the fiber 704 and the fiber array plates 701 and 702.

Figure 8:
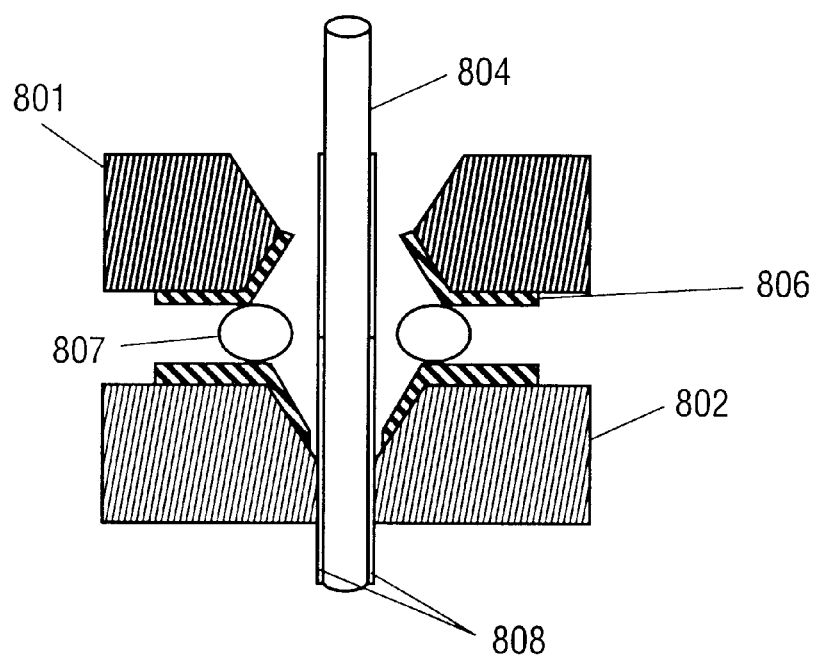

In alternative embodiments, the solder need not be applied as a preform. FIG. 8 illustrates the solder applied, for example, as solder balls 807. One or more solder balls 807 are placed on adhering metal layer 806 in place of the solder preform. Alternatively, other metals having a low melting point (e.g., tin) may be used instead of solder.

Figure 9A:
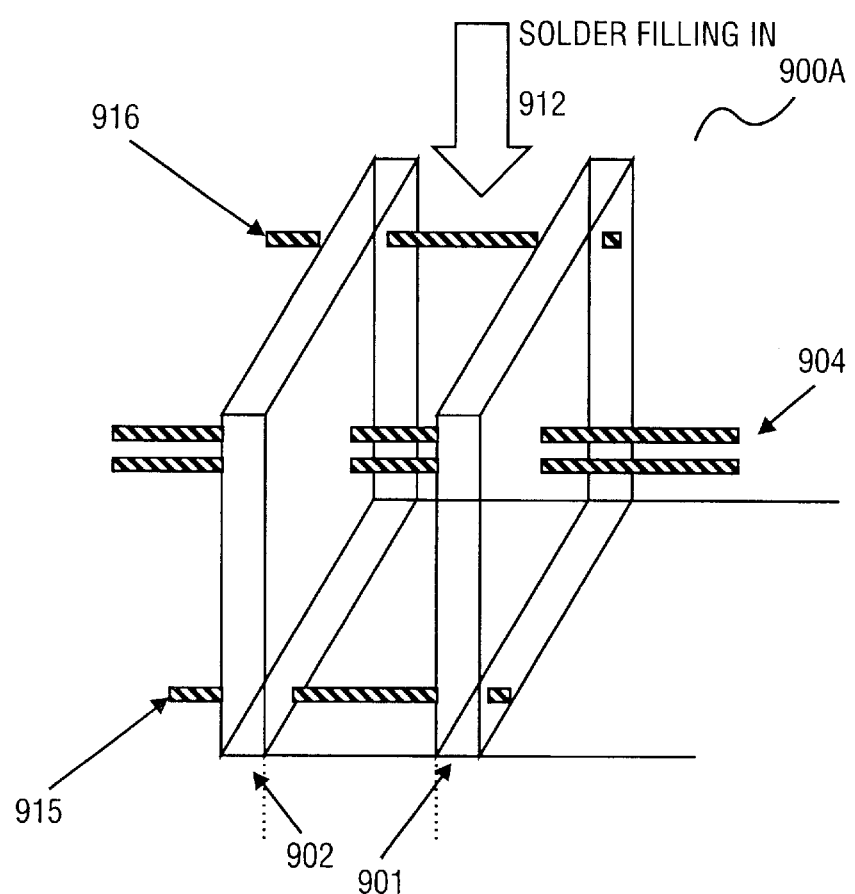
FIGS. 9A, 9B, and 9C illustrate an alternative embodiment of the present invention.
Figure 9B:
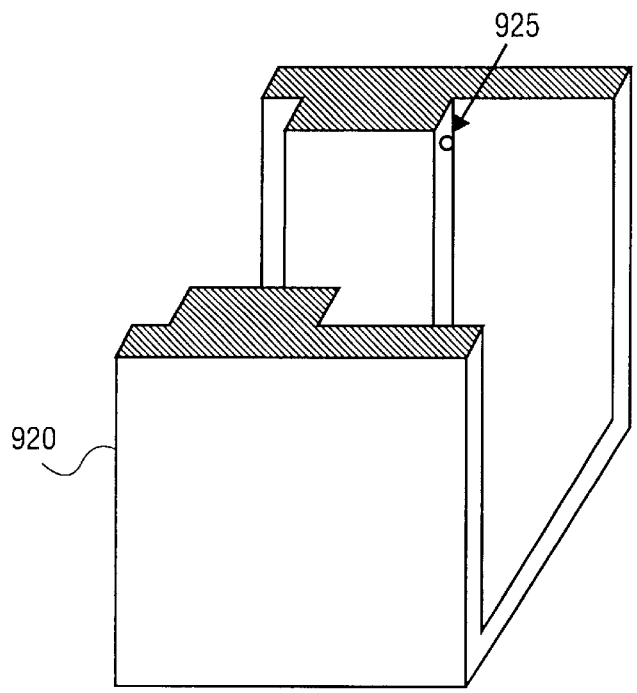
Figure 9C:
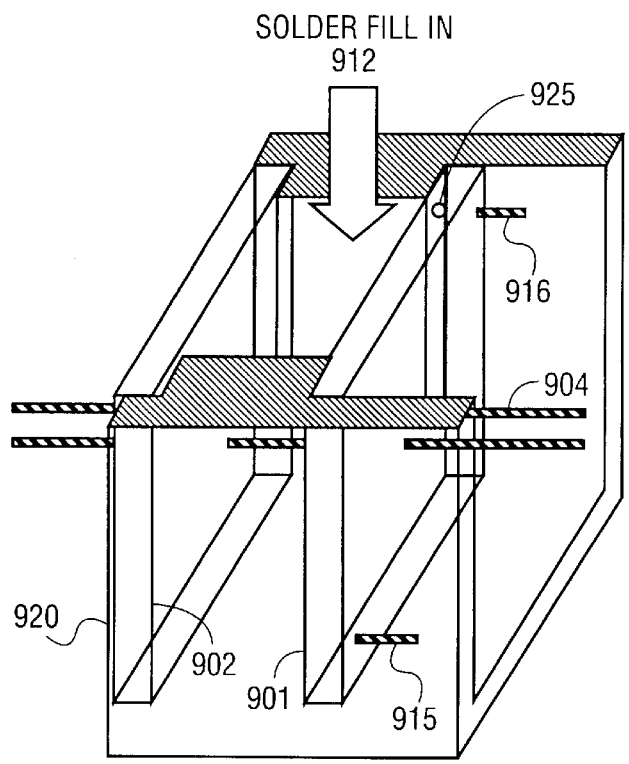

The solder need not be placed on the fiber array plates prior to heating. FIGS. 9A, 9B, and 9C illustrate an alternative embodiment of the present invention. System 900A, shown in FIG. 9A, includes two fiber array plates 901 and 902 having an adhering metal layer (not shown) deposited on them. Alignment pins 915 and 916 hold the two fiber array plates 901 and 902 relative to one another creating a gap 912. In one embodiment the fiber array plates may be positioned approximately 2 mm apart. Liquid solder may then be poured into gap 912 to hermetically seal the system. Alternatively the fiber array plates may be heated and solder applied such that the solder melts and fills gap 912.

In an alternative embodiment the system 900A may be mounted on a base as illustrated in FIG. 9B. Base 920 has a metal adhering layer (not shown) deposited thereon, and alignment holes, for example, alignment hole 925 formed therein.

FIG. 9C illustrates system 900A mounted on base 920. In a preferred embodiment, the metalized fiber array plates 901 and 902 are mounted on the metalized base 920. The fiber array plates are then aligned by positioning the alignment pins in corresponding alignment holes. The metalized fibers 904 are then inserted through the fiber array plates. The base 920 is then heated and liquid solder is poured into gap 912. In an alternative embodiment solder may be applied to base 920 and thereby melting to fill gap 912. In one such embodiment the base is heated to approximately 240° C. and solder with a melting point of approximately 187° C. is applied.

When the solder cools, a hermetic seal is created while each fiber remains accurately positioned. In one embodiment, the process of heating the base and applying solder may be reiterated to form a hermetic seal.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising;

fabricating a fiber array plate, the fiber array plate having an array of holes formed therein;

depositing an adhering metal layer upon the fiber array plate;

positioning a preform on the fiber array plate, the preform having a array of holes, the preform positioned such that the array of holes of the preform correspond to the array of holes of the fiber array plate;

inserting fibers through the fiber array plate, the fibers having an adhering metal layer deposited thereon; and heating the fiber array plate such that a material of the preform melts causing the material to fill any gaps between the fiber array plate and the fiber, thus forming a hermetic seal between the fiber array plate and the fiber.

2. The method of claim 1, wherein the fiber array is fabricated from a material selected from the group consisting essentially of silicon, glass, and ceramic.

3. The method of claim 1, wherein the adhering metal layer is a metal selected from the group consisting essentially of gold, nickel, titanium, and multilayers thereof.

4. The method of claim 3, wherein the adhering metal layer is deposited upon the fiber array plate using a deposition process selected from the group consisting of sputtering, evaporation, electroplating, and electroless plating.

5. The method of claim 1, wherein the material of the preform is solder.

6. The method of claim 1, wherein a material forming the hermetic seal holds the fiber in position.

7. An apparatus comprising:

a fiber array plate having an array of holes formed therein;

an adhering metal layer deposited upon the fiber array plate;

a plurality of fibers inserted through the fiber array plate, the plurality of fibers having an adhering metal layer deposited thereon; and a solder layer disposed between the adhering metal layer of the fiber array plate and the adhering metal layer of the plurality of fibers such that a hermetic seal is formed between the plurality of fibers and the fiber array plate.

8. The apparatus of claim 7, wherein the fiber array plate is fabricated from a material selected from the group consisting essentially of silicon, glass, and ceramic.

9. The apparatus of claim 7, wherein the adhering metal layer is a metal selected from the group consisting essentially of gold, nickel, titanium, and multilayers thereof.

10. The apparatus of claim 7, wherein the adhering metal layer is formed using a deposition process selected from the group consisting of sputtering, evaporation, electroplating, and electroless plating.

11. The apparatus of claim 7, wherein the solder layer is formed by positioning a solder preform on the fiber array plate, the solder preform having an array of holes corresponding to the array of holes of the fiber array plate, and heating the fiber block such that the solder preform melts.

12. The apparatus of claim 11, wherein the melting point of the solder is approximately 187° C.

13. The apparatus of claim 7, wherein the hermetic seal holds the fiber in position.

* * * * *